UNITED STATES PATENT OFFICE.

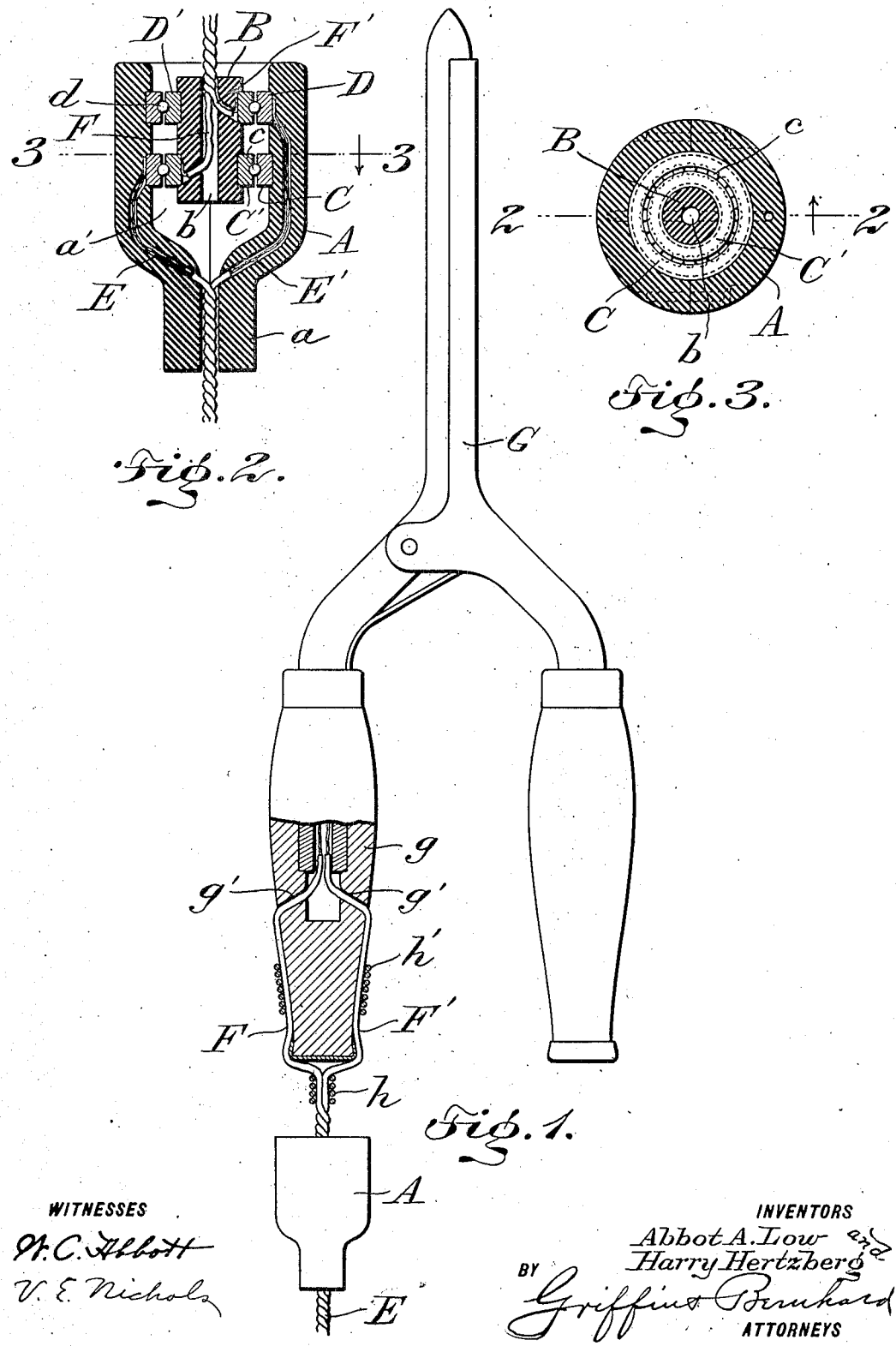

ABBOT A. LOW, OF HORSESHOE, AND HARRY HERTZBERG, OF NEW YORK, N. Y., ASSIGNORS, BY DIRECT AND MESNE ASSIGNMENTS, TO ECONOMY ELECTRIC COMPANY, OF BROOKLYN, NEW YORK, A CORPORATION OF NEW YORK.

SWIVEL FOR ELECTRICAL APPLIANCES.

No. 913,831.   Specification of Letters Patent.   Patented March 2, 1909.

Application filed May 4, 1907. Serial No. 371,873.

To all whom it may concern:

Be it known that we, ABBOT AUGUSTUS LOW and HARRY HERTZBERG, citizens of the United States, residing at Horseshoe, St. Lawrence county, State of New York, and the city of New York, borough of Brooklyn, county of Kings, and State of New York, respectively, have invented a certain new and useful Swivel for Electrical Appliances, of which the following is a specification.

This invention is a swivel for use in connection with different kinds of electrical devices, such as curling irons.

In the operation of various electrical devices or appliances adapted to be supplied with an electrical current by flexible wires or a cord leading from a socket or other device in a circuit, there is a tendency of the wires to become twisted to such an extent as to strain and break the leading-in wires which are usually inclosed within the aforesaid device. More particularly is this true in the case of devices, such as curling irons, having inclosed electrical resistances each composed of a metallic wire or ribbon; and should the device be rotated in one direction for an indefinite number of times, the operation of twisting the leading-in wires will tend to break the resistance wire or ribbon.

One object of this invention is to overcome the foregoing objections and to enable the current to be supplied uninterruptedly to the device or appliance in order that it may be used and manipulated with ease and freedom.

In the accompanying drawings, we have illustrated one practical embodiment of the invention, but the construction shown therein is to be understood as illustrative only, and not as defining the limits of the invention.

Figure 1 is a side elevation showing the swivel of this invention in connection with an electrically heated curling iron, a part of the latter being in section. Fig. 2 is a longitudinal section, on an enlarged scale, through the swivel, the plane of the section being indicated by the dotted line 2—2 of Fig. 3. Fig. 3 is a cross section on the line 3—3 of Fig. 2.

The swivel shown in Figs. 2 and 3 of the drawings consists of the members, A, B, connected together for free rotation, each member having means for the attachment of a plurality of electrical conductors and means whereby said conductors may be connected in series so that the conductors attached to one member may remain at rest while the conductors attached to the other member may rotate freely without having a tendency to twist or wind on the other conductors. The member, A, is represented as a hollow body having a tubular neck portion, a. Said body may be composed of any suitable material, such as hard rubber, indurated fiber, or other non-conducting material, and if desired, said body may be composed of two pieces in order that the several parts may be assembled quickly and easily. The member, B, is composed likewise of non-conducting material, such as rubber or indurated fiber, and it is preferably hollow or tubular in order that the leading-in wires may be attached conveniently thereto. In the embodiment of the invention, shown more particularly in Fig. 2, the hollow member, A, is adapted to serve as an inclosure for the member, B, and to this end it is preferred to construct the member, A, with a chamber, a', which receives the member, B, and certain other parts of the device. In order that the members, A, B, may rotate freely one upon the other it is preferred to connect them operatively one to the other by ball bearing devices, and, as shown, two pairs of ball races and two sets of ball bearings are employed. The ball races, C, C', comprising one pair, are secured to the inner side of the member, A, and the outer side of the member, B, so that the races are in opposing relation, and in the grooved opposing faces of said races are confined the ball bearings, c, comprising one set. The other pair of ball races, D, D', are secured to the opposing surfaces of the members, A, B, respectively, and they receive the bearing balls, d, forming the other set. The races and the bearing balls are composed of metal adapted to conduct the electrical current, and the two groups of ball bearing devices support the member, B, within the member, A, in such a way that either member can rotate freely with respect to the other member. With the member, A, is associated a cord composed of two strands, E, E', which are embedded in the material composing the member, A, or are arranged within the chamber, a', of said member. The wire, E, is connected at one end with the ball race, C, while the other wire, E', is attached to the other ball race, D, substantially as shown in Fig. 2, the two wires being twisted together so as to produce the cord which passes through the tubular neck, a. The wires, F, F', which lead to the device to be heated extend part way through a longitudinal passage, b, of the member, B, and said wires are fastened, respectively, to the ball races, C', D'.

In Fig. 1 of the drawings the swivel is shown as being connected operatively with a handle portion, g, of a pair of curling tongs, or a curling iron, G, adapted to be heated by the passage of an electric current through an electrical resistance (not shown) contained internally of one member of said tongs. The wires, F, F', constitute the leading-in wires to the aforesaid electrical resistance, and said wires may be bound on and arranged with relation to the handle, g, substantially as shown, or they may be arranged in any other preferred or convenient manner. Said wires, F, F', emerge from the swivel body, A, and extend lengthwise of the handle, g, for a suitable distance, after which said wires extend through suitable openings, g', in said handle, g, so as to pass interiorly thereof. The wires are adapted to be united by a tie-wire, h, and they are bound on the handle, g, by another tie-wire, h', thereby minimizing the tendency of the wires to twist one upon the other when the curling tongs are rotated in the operation of winding the hair to be curled and upon the leg or legs of said tongs.

The cord formed by the wires, E, E', may be provided with a plug whereby said cord is adapted to be connected to a socket of an electric circuit. The current passes from the socket through the wire, E, and the ball race, C, across the balls, c, to the ball race, C', and thence by the conductor, F, to the resistance within the curling tongs. The current flows back through the conductor, F', and the ball race, D', across the balls, d, to the ball race, D, and thence through the conductor, E'.

From the foregoing description it will be understood that the current is adapted to be supplied to and conveyed away from a device to be heated without interrupting or breaking the circuit, and furthermore, that the member, B, may rotate freely within the member, A, or said member, A, may turn freely around the member, B, without breaking or interrupting the electrical connection, and without twisting the wires one upon the other.

The swivel of this invention is very compact and simple in construction, it may be manufactured economically, and it may be quickly connected with the leading wires of the devices or appliances to which the current is to be supplied.

Although we have shown and described the swivel as being adapted for use in connection with an electrically heated curling tong, it will be understood that the invention may be used in connection with any electrically heated device, such as a sad iron, a soldering iron, a branding iron or, in fact, to instruments or appliances to which it is desired to supply electrical current without a tendency to twist the wires.

Having thus fully described the invention, what we claim as new, and desire to secure by Letters Patent is:

1. An electrical swivel-connection comprising two members composed of insulating material, one member being positioned substantially within the other, each member being rotatable freely with respect to the other, a pair of annular contacts fixed to one member, another pair of annular contacts secured to the other member, and movable contacts coöperating with the aforesaid contacts, whereby said contacts coöperate in restraining the members from relative endwise movement while affording a continuous path for an electrical current through the swivel connection.

2. An electrical swivel-connection comprising a chambered member having means for the introduction of wires therein, another member provided with means for the introduction of wires therein, a pair of annular contacts secured within the chambered member, a second pair of annular contacts in fixed positions on the external surface of the second member, and rolling contacts coöperating with the aforesaid pairs of contacts for restraining the members from relative endwise movement while permitting free rotary movement of said members and securing a continuous path for an electric current through the swivel.

3. An electrical swivel-connection comprising a chambered member provided with wire-receiving openings, annular contacts secured within the chamber of said member, another member provided with wire-receiving openings, other annular contacts fixed to the second named member, and rolling contacts coöperating with said annular contacts for restraining said members from relative endwise movement while permitting free rotative movement of one member relative to the other.

4. An electrical swivel-connection comprising a plurality of members composed of insulating material, annular contacts composed of rigid conducting material and secured to the respective members, said annular contacts opposing each other in pairs, and rolling contacts coöperating with the annular contacts for positively restraining the members from relative endwise movement while permitting free rotative movement thereof.

5. In a device of the class described, a plurality of members capable of a rotary movement with respect to each other, and annular circuit-contacts provided with ball bearings, said annular contacts coöperating with the respective members and with said ball bearings for restraining the members from having relative endwise movement.

6. In a device of the class described, a plurality of rotatable members, annular ball races in opposing relation to each other and secured on the respective members, bearing balls in said races and coöperating therewith in restraining the members from relative endwise movement, and conductors adapted to be attached to said races.

7. In a device of the class described, a plurality of members rotatable with respect to each other, a plurality of annular circuit-contacts on one of said members, another plurality of annular circuit contacts on the other member, and bearing balls coöperating with the aforesaid circuit contacts for coupling the two members and restraining them from a relative endwise movement.

In testimony whereof we have signed our names to this specification in the presence of two subscribing witnesses.

ABBOT A. LOW.
    HARRY HERTZBERG.

Witnesses:
 JOSEPH F. GARCIER,
 GEO. WELLING GIDDINGS.